April 10, 1973     B. A. WHITEMAN     3,726,744
APPARATUS FOR UNWINDING AND SPLICING STRIPS OF MATERIAL
Original Filed Sept. 18, 1968     5 Sheets-Sheet 1
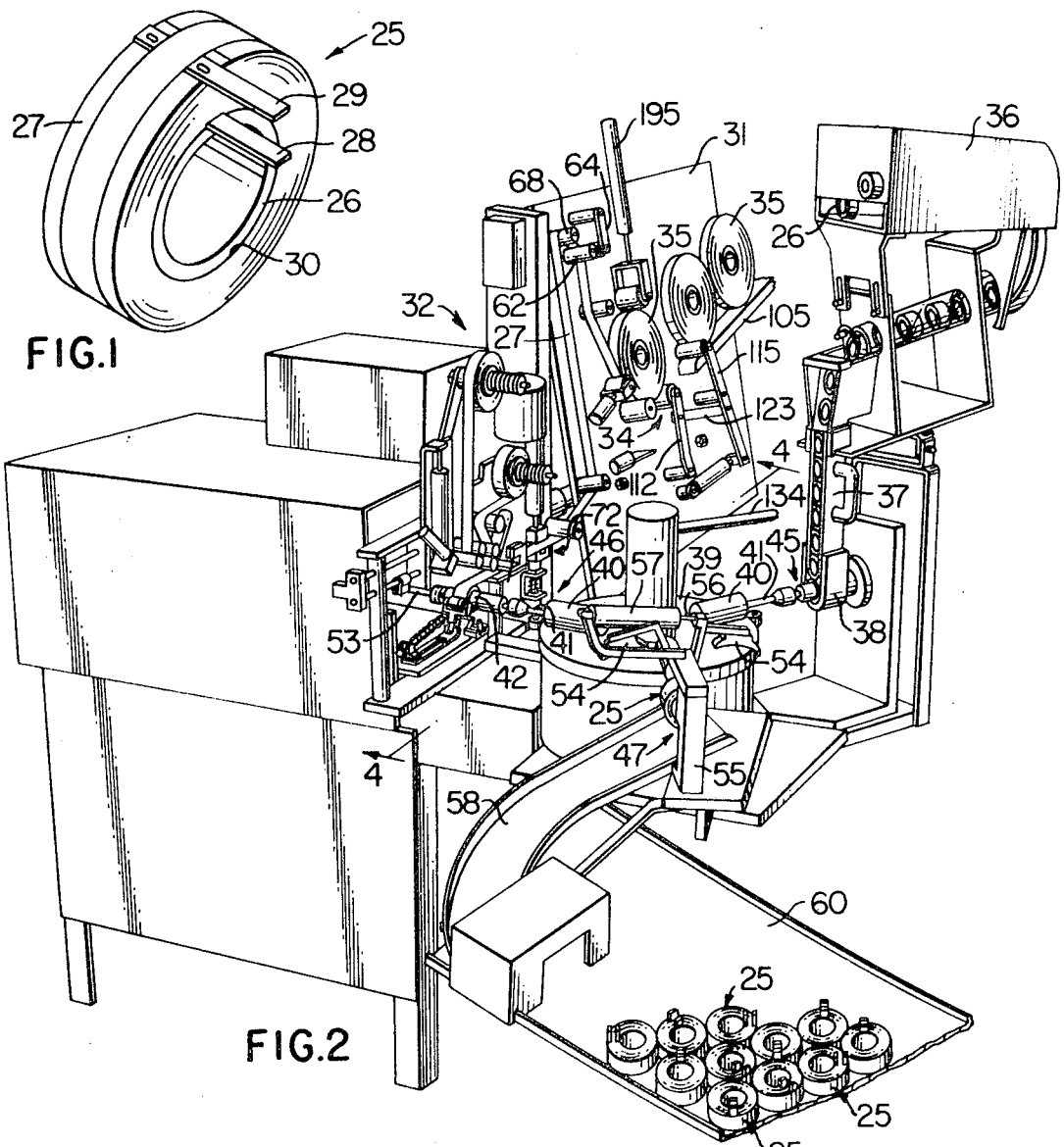
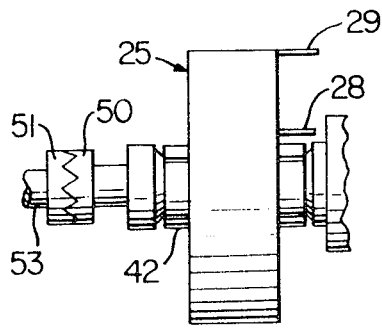
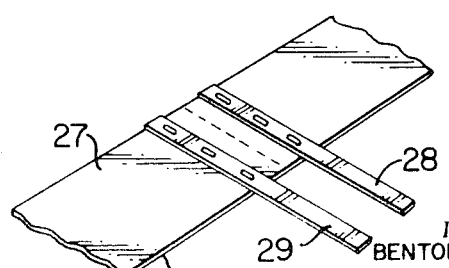
INVENTOR.
BENTON A. WHITEMAN
HIS ATTORNEYS

April 10, 1973
B. A. WHITEMAN
APPARATUS FOR UNWINDING AND SPLICING STRIPS OF MATERIAL 3,726,744

Original Filed Sept. 18, 1968

INVENTOR.
BENTON A. WHITEMAN

HIS ATTORNEYS

April 10, 1973   B. A. WHITEMAN   3,726,744
APPARATUS FOR UNWINDING AND SPLICING STRIPS OF MATERIAL
Original Filed Sept. 18, 1968   5 Sheets-Sheet 3
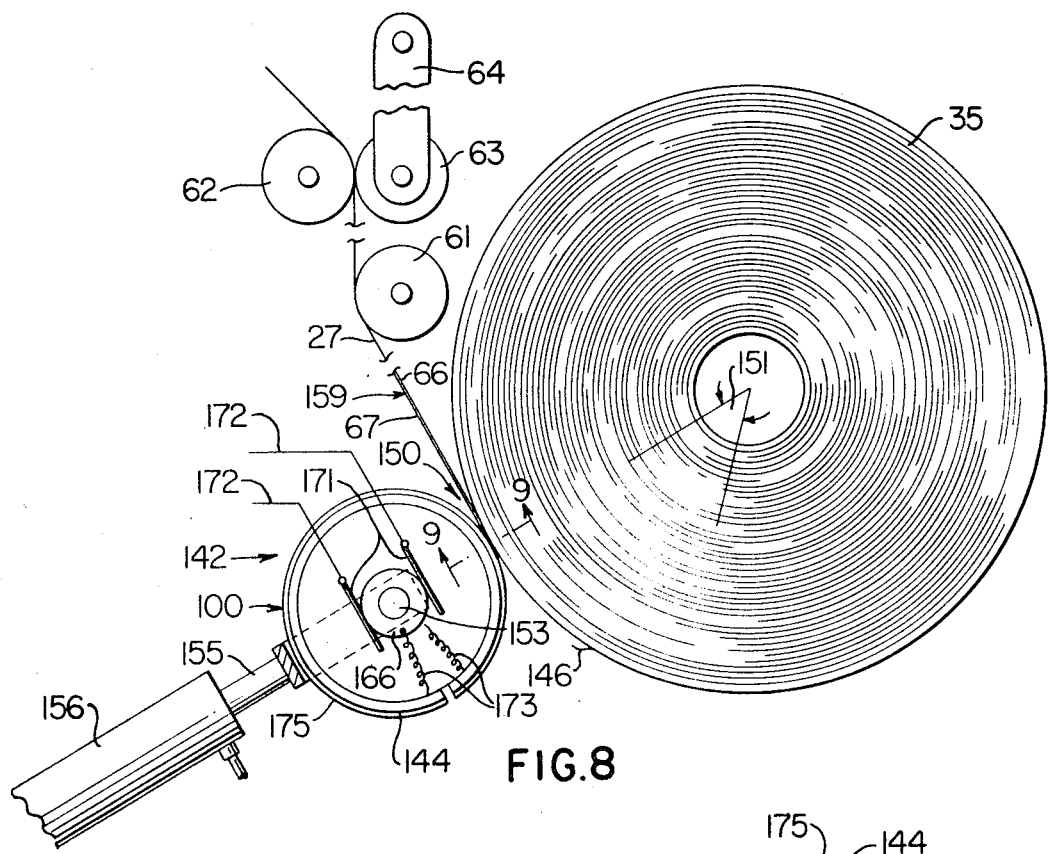
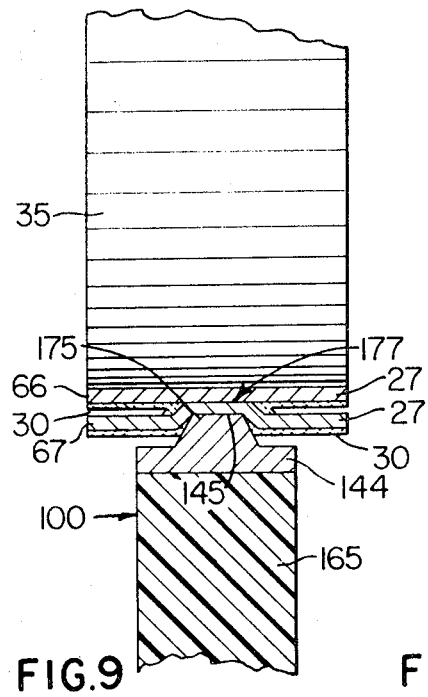
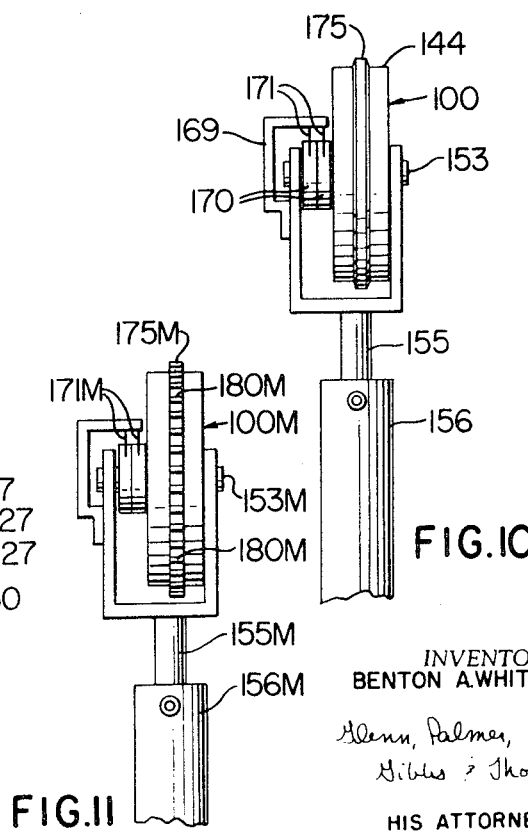
INVENTOR.
BENTON A. WHITEMAN
HIS ATTORNEYS

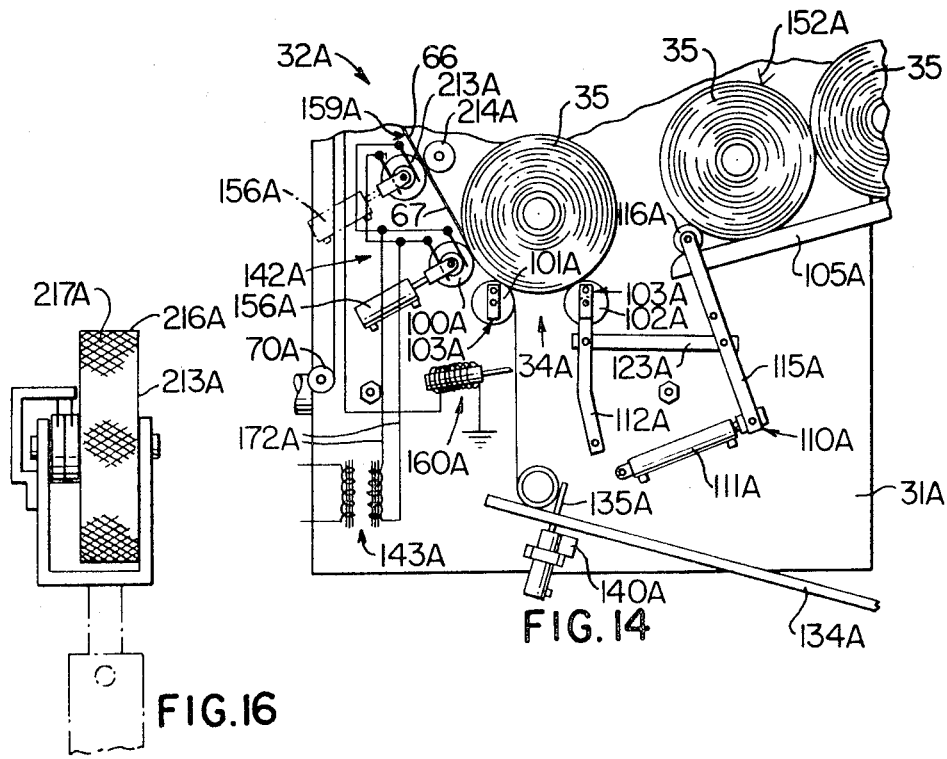
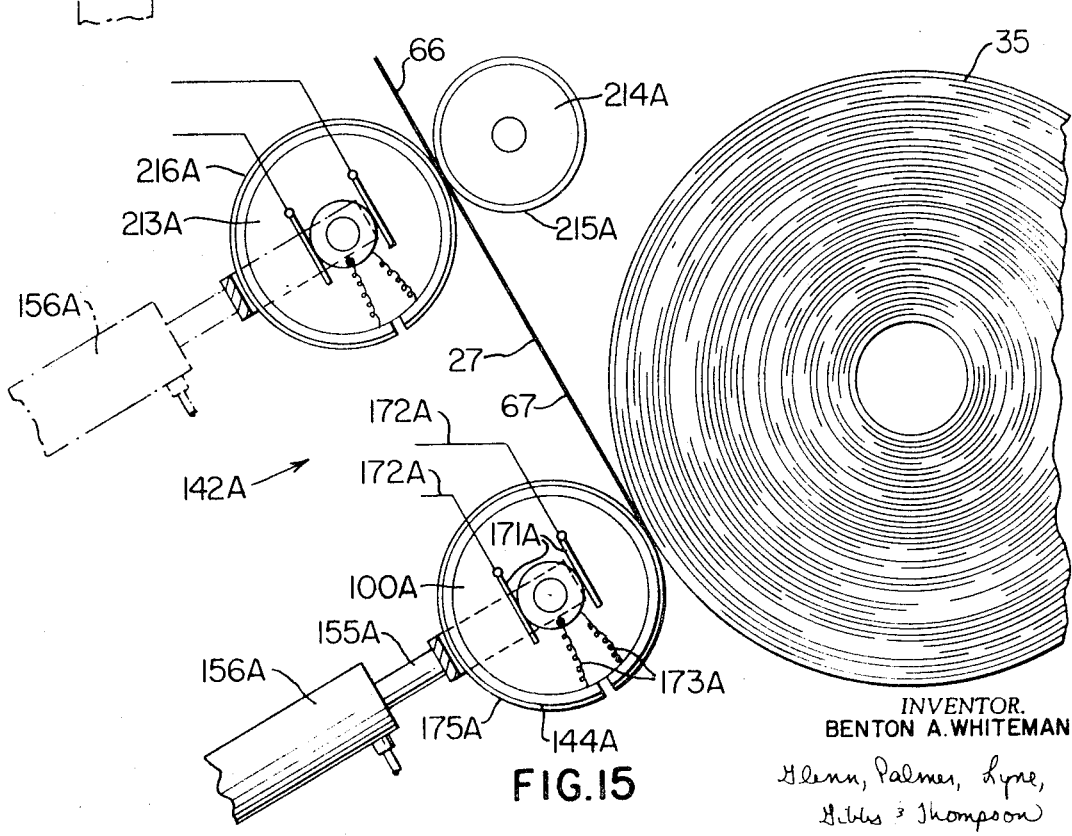

United States Patent Office 3,726,744
Patented Apr. 10, 1973

3,726,744
APPARATUS FOR UNWINDING AND SPLICING STRIPS OF MATERIAL
Benton A. Whiteman, Richmond, Va., assignor to Reynolds Metals Company, Richmond, Va.
Original application Sept. 18, 1968, Ser. No. 760,633, now Patent No. 3,582,010. Divided and this application Jan. 11, 1971, Ser. No. 105,738
Int. Cl. B31f 5/00; B65h 19/18
U.S. Cl. 156—502   21 Claims

ABSTRACT OF THE DISCLOSURE

Apparatus for and method of controlling the unwinding of an elongated strip material from a supply roll thereof during the coiling of such strip material to define a coil construction wherein a substantially planar support inclined at an acute angle relative to a vertical plane is utilized together with a plurality of supporting rollers which engage the lower outer periphery of such supply roll to define an unwinding station. Means is also provided for serially feeding supply rolls to the unwinding station and automatically splicing the leading end portion of each new supply roll to the trailing end portion of an unwound roll without stopping the coiling operation.

CROSS-REFERENCE TO RELATED APPLICATION

This application is a divisional patent application of its copending parent application, Ser. No. 760,633 filed Sept. 18, 1968, now Pat. No. 3,582,010, and is assigned to the same assignee to whom the parent application is assigned; and is related to copending patent application, Ser. No. 497,069, filed Oct. 18, 1965, now Pat. No. 3,412,450.

BACKGROUND OF THE INVENTION

During the unwinding of elongated strip material from a supply roll thereof it has been found that if the supply roll can be accurately controlled so that each section of elongated strip material that is unwound therefrom is unwound in a precise manner and substantially with an edge thereof in a fixed plane it is considerably easier for an associated coil winding machine to coil such unwound section to form a coil construction having a desired configuration. Further, it has been found that a much more efficient coil winding operation is possible if it is not necessary to stop the entire winding operation to thread the leading end of each new supply roll through the associated coil winding machine.

SUMMARY

This invention provides a simple and economical apparatus and method wherein controlled unwinding of an elongated strip material from a supply roll thereof is provided by supporting the supply roll so that it is unwound while a side thereof is held in a fixed plane at an unwinding station. Further, this invention enables a plurality of supply rolls to be serially fed to the unwinding station as well as enabling splicing of the leading end portion of each new supply roll to the trailing end portion of a completely unwound supply roll without stopping the winding operation.

Other details, uses, and advantages of this invention will become apparent as the following description of the exemplary embodiments thereof presented in the accompanying drawings proceeds.

BRIEF DESCRIPTION OF THE DRAWINGS

The accompanying drawings illustrate present exemplary embodiments of this invention, in which FIG. 1 is a perspective view of an exemplary strip conductor coil construction made using the improved apparatus of this invention;

FIG. 2 is a perspective view illustrating one exemplary embodiment of a coil winding apparatus which has the improved apparatus of this invention provided as a part thereof and used to form the coil construction of FIG. 1;

FIG. 3 is a fragmentary perspective view illustrating electrical leads attached to an elongated strip of electrically conductive material used in forming the exemplary coil construction of FIG. 1;

FIG. 5 is a fragmentary view showing the manner of coupling a freely rotatable core-carrying mandrel with drive means therefor;

FIG. 8 is an enlarged view with parts broken away looking substantially normally toward the planar support illustrated in FIG. 4 and particularly illustrating a splicing roller having a heatable outer surface engaged against the terminal end portion of the previously unwound elongated strip and urged against an associated supply roll at the unwinding station to enable splicing the leading end portion of the supply roll and the trailing end portion together by heat sealing such end portions together;

FIG. 9 is a greatly enlarged fragmentary view with parts in section and parts broken away particularly illustrating the manner in which the splicing roller with its heatable outer surface is used to join two associated end portions of strip material;

FIG. 10 is an end view showing the splicing roller of FIG. 8 and a portion of its actuator and particularly illustrating an annular heatable surface comprising such splicing roller;

FIG. 11 is an end view similar to FIG. 10 and illustrating another exemplary embodiment of a splicing roller and its associated actuator wherein the heatable surface of such splicing roller has a toothed configuration;

FIG. 14 is a fragmentary view similar to the right end portion of FIG. 4 and particularly illustrating another exemplary embodiment of a winding apparatus which uses a splicing device having a second splicing roller together with a cooperating backup roller;

FIG. 15 is an enlarged view similar to FIG. 8 particularly illustrating the splicing action of the splicing device illustrated in FIG. 14;

FIG. 16 is a fragmentary view in elevation particularly illustrating a knurled heatable surface comprising the second splicing roller presented in the exemplary embodiment of FIG. 14 of the drawings.

DESCRIPTION OF THE ILLUSTRATED EXEMPLARY EMBODIMENTS

Figure 4:
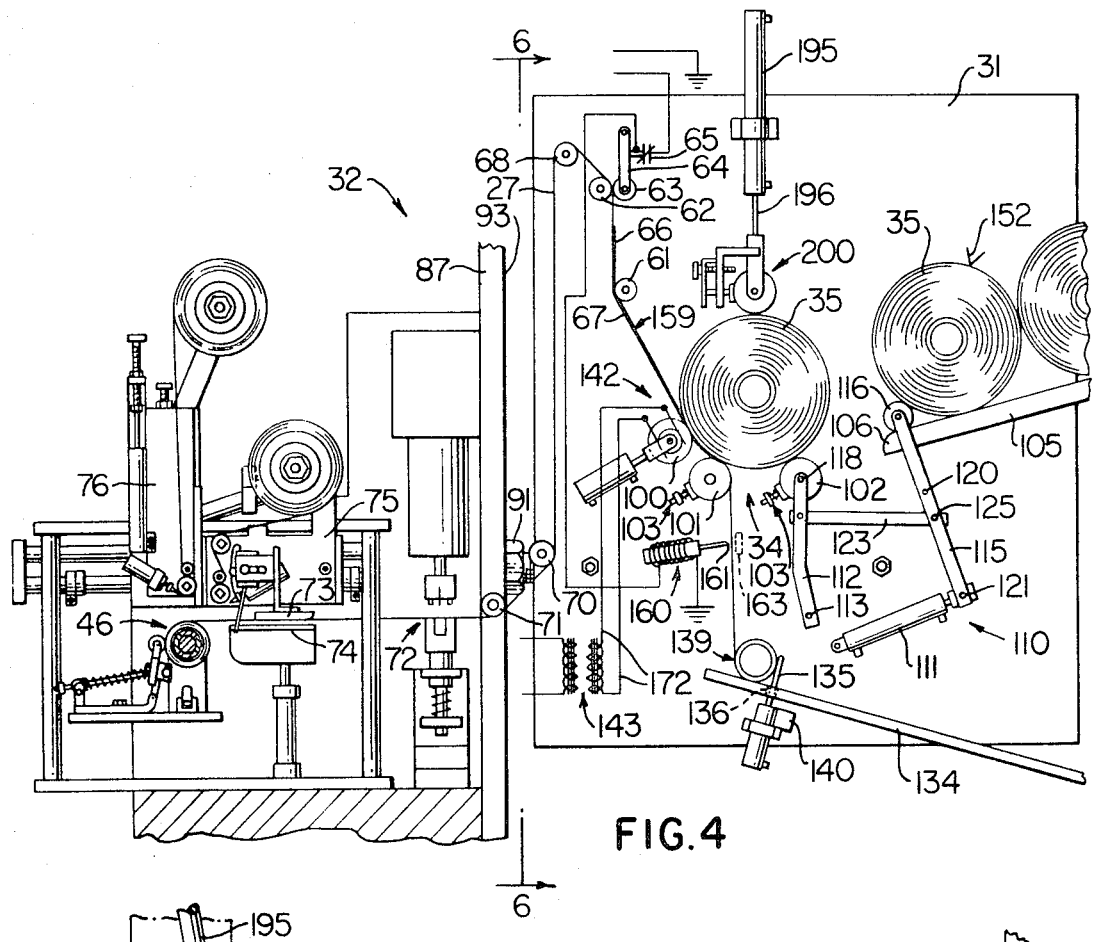
FIG. 4 is a view on the line 4—4 of FIG. 2 particularly illustrating the manner in which the apparatus of this invention is used to control the unwinding of an elongated strip of electrically conductive material from a supply roll thereof which is supported on a plurality of spaced rollers defining a supply roll unwinding station while keeping a side of the supply roll as well as a corresponding edge of the unwound elongated strip in a substantially fixed plane against an associated inclined planar support.

An exemplary strip conductor coil construction or coil made while using the apparatus of this invention is shown in FIG. 1 and indicated generally by the reference numeral 25. The coil 25 comprises a tubular and substantially right circular cylindrical core element 26 which has a ribon or strip 27 of electrically conductive material wound thereon in a manner as will be hereinafter described. The strip 27 has an inner electrical lead 28 and an outer electrical lead 29 suitably fixed thereto. The completed coil 25 is adapted to be installed in an associated electrical system with its leads 28 and 29 suitably electrically connected to associated electrical components in a known manner.

In the exemplary coil 25 presented in FIG. 1 the under side of the elongated strip of conductive material 27 preferably has a strip or coating of electrical insulating material 30 prelaminated thereagainst before the strip 27 is wound on the core elements 26 to provide electrical insulation means between adjacent coils of the strip of conductive material 27. The insulating material may be in the form of a heat-sealable plastic material such as an epoxy resin or other suitable material.

Figure 6:
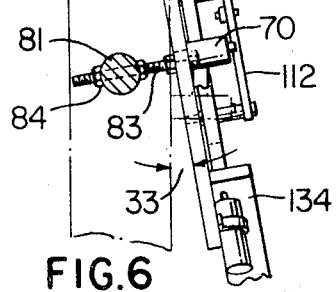
FIG. 6 is a view with parts broken away taken essentially on the line 6—6 of FIG. 4 and particularly illustrating the substantially planar support and its associated components arranged at an acute inclined angle relative to a vertical plane.

The exemplary coil winding apparatus used in forming the strip conductor coil 25 of FIG. 1 in a substantially continuous manner is indicated generally by the reference numeral 32 in FIG. 2. The apparatus 32 includes a frame structure which carries a substantially planar support 31 which in this example of the invention is in the form of a support plate. The support plate 31 is inclined at an acute angle 33 (see FIG. 6) relative to a vertical plane and roller means shown as a plurality of spaced rollers are carried by the support plate 31.

The spaced supporting rollers define an unwinding station designated generally by the reference numeral 34 and a supply roll 35 of electrically conductive strip material 27 has its lower outer periphery supported on the rollers. The spaced rollers cooperate with the support plate 31 and hold the inner side of the supply roll 35 flatly against the support plate 31 so that upon pulling the leading end of the elongated strip material 27 to unwind it from its supply roll 35 the inner side edge of the unwound strip material 27 is precisely held in a plane coinciding with the support plate 31 whereby the elongated strip 27 may then be wound on its associated core 26 with great precision and in any desired manner.

As previously stated, the strip material 27 preferably has a strip or coating 30 of heat-sealable insulating material laminated to its lower surface, see FIG. 3, to provide electrical insulation between adjoining turns and such heat-sealable material 30 is effectively utilized to enable splicing the trailing end portion of a completely unwound supply roll 35 to the leading end portion of a new supply roll introduced onto the winding station 34 defined by the plurality of spaced supporting rollers to enable winding of coils 25 in mass production quantities and without stopping the coil winding apparatus or machine 32.

The tubular core elements 26 may be made of cardboard or the like and are contained in a suitable hopper 36 which has a downwardly extending chute 37 extending from its lower end. Each core element is adapted to be serially fed into a retainer 38 provided at the terminal lower end of the chute 37 and supported to enable it to be easily picked up by an associated mandrel in a manner to be subsequently described.

As illustrated in FIG. 2, the coil winding apparatus 32 carries a rotary table 39 which is adapted to be indexed in a rotary manner about a fixed vertical axis. The table 39 carries three actuators shown as three fluid cylinders each designated by the numeral 40.

Each cylinder 40 has a telescoping rod 41 which carries support means enabling coil 25 to be formed thereon and such support means comprises a radially expandable and freely rotatable mandrel 42 carried at the terminal end of the telescoping rod 41. Each cylinder 40 is adapted to extend and yieldingly hold its mandrel 42 into operative engagement with drive means therefor in a known manner.

The table 39 is adapted to index the mandrels 42 through three stations 45, 46, and 47. When a mandrel 42 is indexed to station 45, the associated cylinder 40 extends its associated rod 41 radially outwardly telescoping its adjoining mandrel 42 within a core element 26 supported with the retainer 38 at the lower end of the hopper 36.

When the mandrel 42 at station 45 has a core 26 thereon, the associated piston rod is retracted by cylinder 40 so that the core 26 is carried by mandrel 42 out of the retainer 38 whereby such retracted mandrel can be indexed from station 45 to winding station 46. Hopper 36 contains a plurality of cores 26 which are adapted to be serially dropped into retainer 38 through chute 37 as previously mentioned. As each core 26 is removed by an associated mandrel from retainer 38 another core 26 drops in its place.

With the core carrying mandrel 42 now at station 46, the piston rod 41 thereof is extended to interconnect mandrel 42 by suitable driven clutch means 50 provided at its terminal outer end to suitable cooperating driving clutch means 51 provided on a rotatable drive shaft 53 comprising winding apparatus 32, see FIGS. 1 and 5. As the drive shaft 53 is rotated, the same rotates mandrel 42 at station 46 to cause elongated strip 27 to be wound on the core 26 carried by the rotating mandrel 42 to define coil construction 25. The elongated strip 27 is unwound from supply roll 35 and is held with its inner side edge in the fixed plane defined by the front surface of the support plate 31 whereby the coil construction 25 may be wound in a precise manner and without the problems which would normally be present if the supply roll 35 were free to move axially during unwinding rotation.

After a completed strip conductor coil 25 has been formed on mandrel 42 at station 46, the associated piston rod 41 is retracted to thereby disconnect the driven mandrel 42 from drive shaft 53 and specifically to thereby move driven clutch means 50 away from driving clutch 51, whereby the retracted mandrel 52 is then indexed from station 46 to station 47. With the completed strip conductor coil 25 on mandrel 42 at station 47, the associated piston rod 41 is extended whereby the strip conductor coil 25 is held in a position at the station 47 so that a pair of stripping members each designated by the mandrel 54, see FIG. 2, can strip the finished strip conductor coil 25 from mandrel 42.

The stripping members 54 are pivotally mounted to a support 55 by suitable pivot pins respectively carrying pinion gears disposed in meshing relation with each other. One of the stripping members 54 is interconnected to a piston rod 56 adapted to be extended and retracted by a fluid cylinder 57 carried by support 55. Thus, with a completed strip conductor coil 25 being held at station 47 by an extended mandrel 42, cylinder 57 is actuated to telescope its rod 56 outwardly and through the action of the above mentioned pinion gears stripping members 54 are brought into clamping engagement in a known manner on opposite sides of coil 25.

With the strip conductor coil 25 now firmly clamped between the stripping members 54 retraction of the piston rod 41 of the mandrel 42 at station 47 pulls such mandrel out of the core 26 of the completed strip conductor coil 25 so that the particular mandrel 42 can be subsequently indexed to the station 45 by indexing table 39. With the mandrel 42 at station 47 now retracted from within core 26 of the completed strip conductor coil 25, the cylinder 57 can be deactuated to return the stripping members 54 to the open position illustrated in FIG. 2 whereby such members drop the completed strip conductor coil 25 onto a chute 58. The completed strip conductor coil 25 moves down chute 58 to a table 60 for subsequent testing, packaging, and the like.

As illustrated particularly in FIG. 4, the elongated strip 27 is adapted to be fed from its supply roll 35 around a turn roll 61 and through a pair of cooperating thickness sensing rollers 62 and 63. The sensing roller 63 in this example of the invention is pivotally supported at the lower end of a lever 64 which has its upper end pivotally mounted on a pivot pin. The lever 64 and roller 63 are urged toward the roller 62 by suitable urging means such as a spring, or the like, and the lever 64 is adapted to engage an electrical switch 65 in response to an increased thickness in the elongated strip 27, such as a double thickness in such an elongated strip, which would be present upon splicing the leading end portion designated generally by the reference numeral 66 of a new supply roll 35 to the trailing end portion designated generally by the reference numeral 67 of strip material 27 previously unwound from a supply roll 35. The action of the rollers 62 and 63 and the operation of the electrical switch 65 will be described in more detail subsequently in this specification in connection with the automatic splicing action provided by the splicing device of this invention.

During a normal winding operation the elongated strip 27 continues beyond the rollers 62 and 63, around another turn roll 68, around a pair of rolls 70 and 71, and then through a device designated generally by the reference numeral 72 which attaches the leads 28 and 29 to the elongated strip 27 in a known manner. The strip 27 continues beyond the lead attaching device 72 between a combination guide means and bearing surface means designated by the numeral 73 and a table 74 to winding station 46.

Apparatus 32 also has a pair of taping head means designated by the numerals 75 and 76 which are employed to start strip 27 on core 26 as well as tape the final coil or layer of coil construction 25 in position to prevent unwinding thereof. The manner in which lead attaching device 72, guide 73, table 74, and taping heads 75 and 76 are utilized in forming coil construction 25 will be more thoroughly understood by referring to the detailed description of similar components fully disclosed in the copending patent application Ser. No. 497,069 referenced above. However, a detailed understanding of the operation of components 72–76 is not necessary to thoroughly understand the operation of the apparatus of the present invention.

Figure 7:
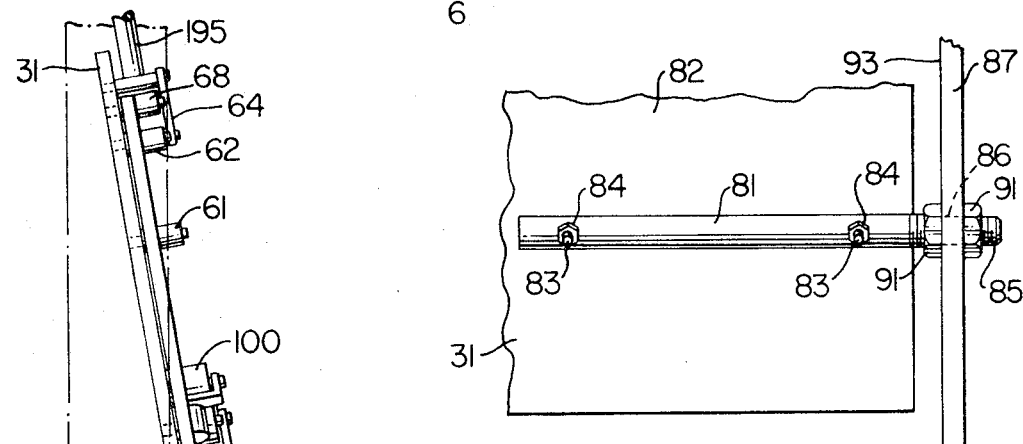
FIG. 7 is a fragmentary view particularly illustrating the structure used to support the inclined planar support which enables the angle of inclination and its position relative to the main portion of the coil winding apparatus to be adjusted.

The support plate 31 supports the supply roll 35 at an acute angle 33 relative to a vertical plane and as previously mentioned. The plate 31 has an elongated bar or rod 81 fixed to the rear surface 82 thereof by a pair of bolts 83 and cooperating nuts 84, see FIGS. 6 and 7. The bar 81 has a threaded outer end portion 85 which is received through an associated opening 86 extending through an upright support portion 87 of the frame structure comprising the winding apparatus 32.

A pair of threaded nuts 91 are provided and threaded on the outer end portion 85 of the rod 81 and tightly against opposite sides of the upright portion 87. The nuts 91 are used to position the upport plate 31 toward and away from the main portion of the winding apparatus 32 and hence toward and away from the rear surface 93 of the upright support 87. The nuts 91 and threaded end portion 85 may also be used to adjust the angle of inclination of the support plate 31 relative to a vertical plane simply by rotating the rod 81, and hence the support plate 31 fixed thereto, within the opening 86 and about an axis extending longitudinally through the rod 81. Once the desired angle of inclination is provided the nuts 91 are firmly tightened against opposite sides of the upright support 87 to thereby hold the support plate 31 in position.

As previously indicated, roller means comprising a plurality of spaced rollers are provided and engage the lower periphery of the supply roll 35 to define the supply roll unwinding station 34, see FIG. 4. In this exemplary embodiment of the invention a plurality of three support rollers define the unwinding station 34 and such support rollers are designated by the reference numerals 100, 101 and 102 respectively. The support roller 100 of this example is in the form of a splicing roller having a heatable outer surface and will be described in more detail subsequently. However, it will be appreciated that in some applications of this invention the splicing roller may be normally carried in a retracted position and is only extended into contact with a new supply roll 35 when it is desired to achieve splicing. The rollers 100–102 are supported so their axes are arranged substantially perpendicular to the support plate 31 and the rollers 100–102 have suitable bearings to enable substantially frictionless rotation thereof.

Each supply roll 35 is supported for free rotation at the unwinding station 34 and upon pulling the leading end of the elongated strip 27 comprising such supply roll unwinding takes place with the supply roll 35 rotating with its inner face or side in frictional contact with the support plate 31 and the unwound elongated strip 27 is also moved so that its inner edge contacts and is guided by the front face of the support plate 31.

To control the force required to be exerted against the leading end 66 of the elongated strip material 27 a brake device may be provided for use with one or more of the spaced supporting rollers and in this example of the invention a brake device 103 is used with the rollers 101 and 102. The brake device 103 will be described in more detail subsequently; however, it will be appreciated that the purpose of the brake device 103 is to restrain the rotation of its associated roller in a controlled manner and thereby control the force required to be exerted to rotate and unwind the supply roll 35 and thus control the tightened or compactness with which each particular coil construction 25 is wound.

Each supply roll 35 may be placed in position at the unwinding station 34 in any suitable manner; however, in this example of the invention, a supply roll feed system is provided for serially moving a plurality of supply rolls 35 to the unwinding station 34 and such feed system cooperates with the force of gravity to introduce each new supply roll 35 into unwinding position at the unwinding station 34. In particular, it is seen from FIG. 4 that the support plate 31 has a downwardly inclined table 105 suitably fixed thereto and the table 105 has a lower end 106 arranged essentially above the lowermost of the plurality of spaced supporting rollers 101 and 102.

The feed system for serially feeding the supply rolls 35 onto the unwinding station 34 is in the form of a roller and linkage system (see FIG. 13) designated generally by the reference numeral 110 and such roller and linkage system 110 is operated by an actuator 111. The roller and linkage system 110 is defined by a normally substantially H-shaped linkage assembly comprised of a first arm 112, which may also be referred to as leg 112, which is arranged substantially vertically and is pivotally supported at its lower end by a pivot pin 113 with the support roller 102 comprising the support rollers of unwinding station 34 being rotatably supported about a pivot pin 118 adjacent the upper end of the arm 112. The H-shaped linkage assembly has a second arm 115, which may also be referred to as leg 115, arranged substantially parallel of the first arm 112 and rotatably supporting what will be referred to as a stop roller 116 adjacent the upper end of the arm 115 and about a pin 119. The arm 115 has its center portion pivotally supported about a fixed pivot pin 120 and its lower portion operatively connected by a pin 121 to a bracket fixed to the outer end of a telescoping rod 122 comprising the actuator 111. The H-shaped linkage assembly has a transverse arm 123 pivotally connected to the arms 112 and 115 by a pair of pivot pins 124 and 125 respectively.

Thus, it is seen that the H-shaped roller and linkage assembly 110 has the lower end of its normally substantially vertical leg 112 supported by pin 113 fixed to the support plate 31 and has its leg 115 supported by the fixed pivot pin 120 so that it may be easily pivoted about pins 113 and 120 by the actuator 111. The manner in which the roller and linkage assembly 110 and its associated rollers are actuated to serially introduce the supply rolls 35 into unwinding station 34 will be described in more detail subsequently.

The coil winding apparatus or machine 32 normally winds each coil 25 at a given substantially constant speed and the leads 28 and 29 are suitably fixed in position in a known manner. As the winding of production coils 25 continues and a particular supply roll 35 supported in position at the unwinding station 34 is nearly completely unwound, i.e. spent, a suitable sensor, such as a photoelectric cell, may be used to detect the reduced size of the nearly spent coil to shift the winding apparatus 32 so it will operate at what will be referred to as "jog" speed whereby the linear speed of the strip 27 being wound is substantially reduced.

Figure 13:
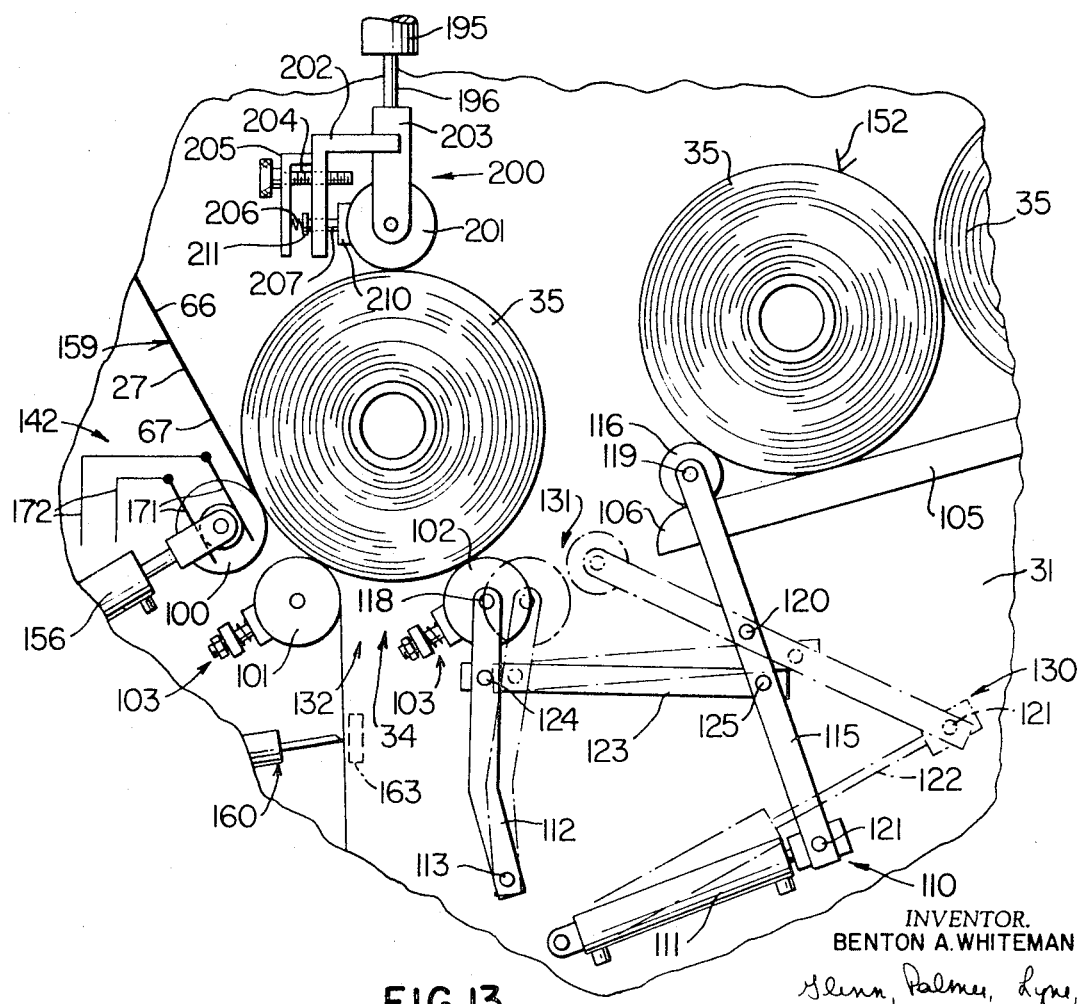
FIG. 13 is a greatly enlarged fragmentary view particularly illustrating a roller and linkage system comprising a feed system used to automatically feed new supply rolls to the supply roll unwinding station.

As the apparatus 32 goes into reduced speed the actuator 111 is simultaneously actuated using any suitable known technique thereby extending its telescoping rod 122 from the solid line position illustrated in FIG. 13 to the dotted line position illustrated at 130 in such figure whereupon the upper ends of the arms 112 and 115 with their associated rollers 102 and 116 respectively are pivoted rapidly toward each other to an intermediate supporting position indicated at 131. As the stop roller 116 moves to the supporting position at 131 an adjoining lowermost supply roll supported on the table 105 rolls by gravity over the stop roller 116 and then over the roller 102 into an unwinding position at the unwinding station 34. The actuator 111 is then rapidly returned to its original positon shown by sold lines in FIGS. 4 and 13.

The actuator 111 holds its telescoping rod 122 in its extended position for a predetermined time interval which may be controlled by any suitable electrical circuit which may include an electrical time delay relay, or the like, whereupon the actuator 111 is rapidly returned to its original retracted position to thereby return the stop roller 116 to its normal stopping position and stop the supply roll previously adjoining the lowermost supply roll 35 adjacent the lower edge 106 of the table 105 and hold such previously adjoining supply roll 35 in position awaiting introduction thereof (in a similar manner as previously described) to the unwinding station 34. As the actuator 111 returns to its original position the roller 102 is also rapidly returned to its normal supporting position at the unwinding station 34 to define one of the supporting rollers of the unwinding station 34.

In this example of the invention the roller 102 moves away from its brake device 103 once it is moved to its intermediate supporting position at 131; however, once the H-shaped linkage assembly 110 is returned to its original position the brake device 103 is effective to provide the controlled restrained rotation of roller 102 which may have been previously set thereon.

In this disclosure of the invention the presentation has proceeded by describing the manner in which the actuator 111 is actuated after a suitable sensing means of the apparatus 32 has been energized to operate the apparatus 32 at what has been referred to as a jog or reduced speed. The reduced speed referred to may be provided in any suitable manner and the strip 27 moved to the winding station 46 by either a continuous comparatively slow movement or an intermittent movement.

However, it will be appreciated that the actuator 111 may also be operated without the requirement of providing a special sensing device in the winding apparatus 32 to detect the size of the nearly spent supply roll. For example, a signal to the actuator 111 may be provided by a nearly spent roll dropping through an opening 132, see FIG. 13, between the rollers 101 and 102 and striking an inclined ramp 134, see FIG. 4, which has a stop rod 135 extending through a suitable elongated opening 136 in the ramp 134. The lower end of the stop rod 135 may actuate a suitable electrical switch 140 which may have a separate circuit used to energize the actuator 111. In providing a system which utilizes a signal from a dropping spent supply roll it is to be understood that the brake devices will be suitably constructed and arranged to allow the spent supply roll to drop freely through the opening at 132.

However, the switch 140 provided in this examplary embodiment of the invention does not energize the actuator 111 but is used to energize the unique device designated generally by the reference numeral 142 and used to automatically splice the leading end portion 66 of the new supply roll 35 to the trailing end portion 67 of the nearly spent supply roll.

The splicing device 142 includes what has been referred to as a splicing roller 100 and in this example of the invention the rotatable splicing roller 100 comprises one of the spaced support rollers defining the unwinding station 34. The operation of the splicing device 142 is such that the splicing action can be achieved in a continuous manner without completely stopping the winding apparatus 32 and as will now be described in detail.

As the nearly spent supply roll 35 drops through the opening 132 a substantial amount of strip material may still remain thereon. Once the nearly spent supply roll indicated at 139 strikes the stop rod 135 the electrical switch 140 is actuated and the splicing device 142 is actuated. At this point the winding apparatus 32 is operating at reduced speed as previously mentioned and a new supply roll 35 has been autmtaically moved into the unwinding station 34 as previously described.

The new supply roll 35 engages the top surface of the trailing end portion 67 of the elongated strip 27 from the nearly spent supply roll whereby the frictional contact between th outermost turn of the new supply roll 35 at the unwinding station 34 and end portion 67 causes the new roll 35 to be rotated as the trailing end portion 67 is moved by the winding apparatus at reduced speed. The electric switch 140 is electrically connected in any suitable known manner to an electrical transformer 143 which supplies electrical power to a heat shoe defining an electrically heatable outer surface 144 of the splicing roller 100 during rotation of the splicing roller 100 and in a manner as will be described in more detail subsequently.

As the outer surface 144 is electrically heated it melts through the heat-sealable plastic insulating material 30 provided on the trailing end portion 67 of the elongated strip 27 as indicated at 145 in FIG. 9 and the heated surface 144 also heats the plastic material 30 on the leading end portion 66 of the new supply roll 35 to a condition of tackiness so that as the forward end 146 of leading end portion 66 moves between the splicing roller 100 and the new supply roll 35 as illustrated at 150 (see FIG. 8) the forward end 146 adheres against the trailing end portion 67 and is moved toward the sensing rollers 62 and 63. The forward end 146 may be at practically any position about the outer periphery of a new supply roll 35 as it is introduced into the unwinding station 34.

However, it will be appreciated that there will be no tendency to separate the outer turn of a new coil 35 and adhere it to the trailing end portion 67 even though the condition of tackiness may be provided theeron because any tacky condition of the outer turn with the forward end 146 at any position about the outer periphery of the new supply roll will not exert sufficient force to detach the forward end 146 until after it moves past the splicing roller 100. Thus, with the forward end 146 in the position illustrated in FIG. 8, for example, the tacky condition is not yet effective to pull the forward end 146 loose. Further, the manner in which the forward end 146 is adhered to its supply roll 35 and the force required to assure that end 146 will become unfastened at the right time may be accurately controlled to assure the desired operation.

It will also be appreciated that each supply roll 35 may be supported on the inclined table 105 with the forward end 146 of its outer turn taking into account the angular distance that it must roll down the table 105 and over the rollers 116 and 102 in their intermediate supporting positions so that it will be placed in position at the unwinding station 34. Thus, each supply roll 35 may be placed so that the forward end 146 of its leading end portion 66 will be angularly displaced from the splicing roller 100 only a small angular distance, within an angle of 45°, for example, and as illustrated by the angle 151 in FIG. 8. To facilitate placing each supply roll 35 on the inclined table 105 with its forward end 146 at the correct position a suitable mark may be placed on the support plate 31 for the forward end of each supply roll and as indicated at 152, see FIG. 4, for the lowermost supply roll 35. This technique assures that each new supply roll 35 introduced onto the unwinding station need be rotated only a minimum angular distance for its forward end to move over the splicing roller 100.

However, even if the forward end 146 is displaced a comparatively large amount away from the splicing roller 100, the heating of the outermost turn of the new supply roll 35 assures that a condition of tackiness is provided whereupon the contact between the splacing roller 100 and the new supply roll 35 at essentially one point is sufficient to assure nonslipping rotation of the new supply roll at the unwinding station 34 and until the forward end 146 is separated from the new supply roll 35 and end portions 66 and 67 heat sealed together.

The splicing roller 100 may be rotatably supported about a suitable shaft which may be carried by the support plate 31; however, in this exemplary embodiment of the invention a shaft 153 is provided and supported on a bracket defining the forward end of a telescoping rod 155 of an actuator 156. The actuator 156 is utilized to provide a limited predetermined movement of the splicing roller 100 toward and against the new supply roll 35 to assure a more effective heating of the trailing end portion 67 of the elongated strip 27 and the more effective creation of a tacky condition between end portions 66 and 67. Further, with the actuator 156 in a retracted position the roller 100 may normally engage the supply roll 35 and with the roll 35 at full diameter provide some support therefor. However, it will be appreciated that the splicing roller 100 need not necessarily be provided so that it will normally initially engage the outer periphery of the new supply roll 35 and in many applications of this invention the splicing roller 100 may be spaced away from the outer periphery of a new supply roll 35 and is moved into position by the actuator 156 once it is desired to splice the leading end portion 66 of a new supply roll to the trailing end portion 67 of a strip 27 in the manner described above.

Once the leading end portion 66 of the new supply roll 35 is spliced to the trailing end portion 67, the double thickness section indicated by the reference numeral 159, FIGS. 4 and 8, moves between the sensing rollers 62 and 63 whereupon the lever 64 carrying roller 63 is pivoted counterclockwise as viewed in FIG. 4, energizing the electric switch 65 which utilizes any suitable known electrical circuitry to actuate a solenoid operated cutting knife 160 which has a sharp cutting edge 161 which severs that portion of the trailing edge portion 67 which is arranged beneath the knife 160 and adjoins the nearly spent supply roll. Thus, a comparatively short double thickness section 159 is provided in the continuous strip 27 only for a distance as determined by the distance between the sensing rollers 62 and 63 and the knife 160.

The electrical switch 65 also utilizes suitable known circuitry to deenergize the transformer 143 thereby discontinuing the heating of the heatable outer surface 144 of the splicing roller 100. Further, the switch 65 may also be suitably electrically connected to the actuator 156 to cause retraction of the telescoping rod 155 from its extended position.

The winding apparatus 32 may be automatically programmed so that once a double thickness section passes through the sensing rollers 62 and 63 the apparatus 32 will continue to wind for a predetermined time period sufficient to completely wind the double thickness section 159 on a coil 25 and then automatically terminate the winding action whereupon the coil with a double thickness portion therein would be rejected. However, it may be established by test that even with a double thickness section a completed coil 25 may have the desired physical and electrical characteristics whereupon such coil would then be wound in a normal manner without special programming for the apparatus 32. The sensing switch 65 may also be suitably electrically connected to the winding apparatus 32 to shift such winding apparatus from its reduced speed operation, at which it has been operating during the introduction of a new supply roll 35 onto the unwinding station 34 and the splicing of such new roll to the trailing end 67 of the elongated strip 27, to its normal high speed operation.

The severing knife 160 with its cutting edge 161 may also be provided with an optional backup plate 163 which is shown by dotted lines in the drawings. The backup plate 163 enables the strip 27 to be sandwiched between the knife edge 161 and such backup plate to assure a more efficient severing action.

The splicing roller 100 may be of any suitable construction and in this exemplary embodiment of the invention suitable structure is provided to enable the outer heatable surface or heat shoe 144 thereof to be electrically resistance heated while allowing free rotation of the splicing roller 100, see FIGS. 8–10. In particular, the outer heatable surface 144 is made of a siutable electrically conductive metallic material of known controlled resistance and is supported by an inner disc 165 made of an electrical insulating material. The splicing roller 100 has a hub portion 166 through which the fixed shaft 153 extends in electrically insulated relation and the hub 166 has a pair of annular bands 170 made of electrically conductive material which are electrically insulated from each other and from the central shaft 153.

A pair of brushes or spring contacts 171 are suitably attached to a bracket 169 fixed to the terminal end of the telescoping rod 155 and each spring contact 171 contacts an associated electrically conductive band 170. Electrical current flow from the transformer 143 is provided through a pair of electrical lines 172 to the spring contacts 171 so that with rotation of the splicing roller 100 a complete electric circuit is provided by contacts 171, annular bands 170, and a pair of electrical leads 173 electrically connected to opposite ends of the heatable surface or substantially annular heat shoe 144.

Only one technique has been illustrated for substantially instantaneously heating the outer heatable surface 144 of the splicing roller 100 to a sufficiently high temperature to enable heat sealing of end portions 66 and 67 together; however, it will be appreciated that any suitable means or technique may be utilized to heat the outer heatable surface 144.

The outer heatable surface 144 in this example of the invention is defined in the form of a single substantially annular ridge 175 which has its opposite ends arranged in spaced relation and ridge 175 is electrically resistance heated in the manner described above. The annular ridge 175 has a width substantially smaller than the width of the splicing roller 100 and thereby is capable of providing a high heat over a comparatively small surface area to thereby cause a corresponding width of the electrical insulating material 30 to be melted to a tacky condition and provide splicing of the end portions 66 and 67 as well as melt away a substantial amount of the electrical insulating material 30 to provide metal-to-metal contact between the metallic portions of the elongated strips 27, as indicated at 177 in FIG. 9, to thereby provide a high quality electrical connection between the trailing end portion 67 and leading end portion 66.

To provide an even higher quality electrical connection as well as a high quality splice between end portions 66 and 67 the splicing roller 100 may have a toothed annular ridge which is designated generally by the reference numeral 175M and shown in FIG. 11 of the drawings. The toothed annular ridge 175M has a plurality of substantially identical teeth 180M. The remaining component portions of the splicing roller 175M will be designated by the same reference numerals as corresponding portions of the splicing roller 100 also followed by the letter designation M and not described again in detail. Further, it should be understood that the previous description of corresponding component portions is fully applicable. Also, the splicing roller 175M may be utilized interchangeably with the splicing roller 100, as desired.

Figure 12:
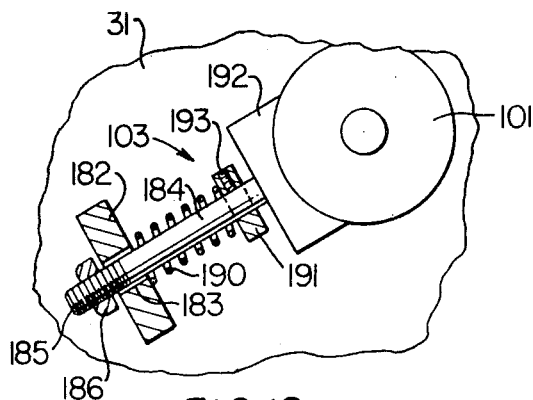
FIG. 12 is an enlarged fragmentary view in elevation illustrating one exemplary embodiment of a brake device used with each spaced support roller supporting the supply roll at the unwinding station.

As previously indicated each supporting roller 101 and 102 may utilize a brake device 103 and the brake device 103 is illustrated in more detail in FIG. 12 of the drawings. Each brake device 103 is used to restrain the rotation of its associated roller 101 or 102 thereby making it more difficult to rotate the supply roll 35 and hence control the tension in the elongated strip 27 as it moves toward the winding station 46 and thereby help control the compactness with which a particular coil 25 is wound.

The brake device 103 comprises a support block 182 which is suitably fixed to the support plate 31 and has a comparatively large opening 183 extending therethrough. A rod 184 having a threaded end portion 185 is provided and extends through the opening 183 and a nut 186 is threaded over the threaded portion 185. A compression spring 190 is provided, and acts between the support block 182 and a collar 191 attached to rod 184, to normally urge a brake shoe 192 fastened at the forward end of the rod 184 against the outer periphery of an associated roller, either 101 or 102. The collar 191 may be adjusted axially along the rod 184 and suitably fastened at any desired axial position by a set screw 193 to thereby adjust the force with which the brake shoe 192 is urged by spring 190 against its associated roller.

Means may also be provided for urging the supply roll 35 more firmly toward and against its supporting rollers 101 and 102 to provide greater tension in the strip 27 during the unwinding of each supply roll 35. In this exemplary embodiment of the invention a suitable actuator 195, see FIG. 13, is provided and the actuator 195 has a telescoping rod 196 which carries an assembly 200 at its outer end. The assembly 200 has a roller 201 rotatably supported at its lower end and a substantially L-shaped bracket 202 is fixed to the main portion 203 of the assembly 200.

A threaded adjusting screw 204 is provided and extends through an associated threaded opening in the bracket 202. The screw 204 engages and adjustably pivots the lower end of another substantially L-shaped member 205 against a compression spring 206 which is arranged at the lower end of the assembly 200. The spring 206 urges a telescoping rod 207 carried by bracket 202 toward the roller 201 and the rod 207 carries a brake shoe 210 at its outer end which is urged into frictional contact against the rotatable roller 201. One end of the spring 206 is engaged by member 205 and its opposite end is urged against a disc 211 fixed to the outer end portion of the telescoping rod 207. The force with which brake shoe 210 is urged against the roller 201 may be controlled simply by threading the adjusting screw 204 in or out as desired to vary the force exerted by spring 206. Also, the spring 206 is easily interchangeable with a similar spring which exerts the desired force. Thus, it is seen that the assembly 200 cooperates with the brake device 103 to provide even more precisely controlled unwinding of the supply roll 35 at the unwinding station 34.

Another exemplary embodiment of the winding apparatus or machine of this invention is illustrated in FIGS. 14–16 of the drawings. The apparatus illustrated in FIGS. 14–16 is very similar to the apparatus 32; therefore, such apparatus will be designated generally by the reference numeral 32A and parts of the apparatus 32A which are very similar to corresponding parts of the apparatus 32 will be designated by the same numeral as in the apparatus 32 also followed by the letter designation A and not described again. Only those component parts of the apparatus 32A which are different from corresponding parts of the apparatus 32 will be designated by a new reference numeral also followed by the letter designation A and not described in detail. For those component parts of the apparatus 32A which carry the same reference numerals as corresponding parts of the apparatus 32 the previous detailed description is fully applicable and therefore will not be repeated.

The main differences between the apparatus 32 and the apparatus 32A are in the splicing devices and the brake devices for the support rollers. The splicing device 142A of apparatus 32A utilizes a second splicing roller which will be designated generally by the reference numeral 213A and the splicing roller 213A may be substantially identical to the splicing roller 100A and may be provided with substantially identical component portions, associated actuator 156A, and may be energized by the same electrical circuitry used to energize the actuator 156A used with roller 100A. The roller 213A is used with a cooperating backup roller 214A and the backup roller 214A has a cooperating outer surface 215A which is adapted to engage the leading end portion 66 of a roll 35 in the unwinding station 34A and hold it against end portion 67 which is engaged by an outer heatable surface 216A of the splicing roller 213A.

The outer heat shoe or surface 216A may have any desired configuration and as illustrated in FIG. 16 the exemplary splicing roller 213A has a knurled heatable surface, i.e. a heatable surface 216A which has a knurled heated in a similar manner and with substantially identical components used to heat the heatable surface 144A of the first encountered splicing roller 100A.

The backup roller 214A may be provided with a resilient rubber-like outer surface 215A which is adapted to receive the projection means comprising the knurled heatable surface 216A; however, the backup roller 214A may have a corresponding contoured configuration which is particularly adapted to receive projections 217A comprising the knurled heatable surface 216A. The splicing device 142A with its additional splicing roller 213A and cooperating backup roller 214A assure that a higher quality splice is provided between end portions 66 and 67 while also providing an improved electrical connection therebetween.

The actuator 156A comprising the splicing device 142A is optional and thus has been presented by dotted lines in the drawings. However, it is to be understood that any suitable means may be provided for urging and holding the second splicing roller 213A and its backup roller 214A suitably urged toward each other.

Although a knurled heatable surface 216A has been illustrated on the splicing roller 213A of this exemplary embodiment of the invention, it will be appreciated that any desired configuration may be provided on either the splicing roller 213A or the backup roller 214A. Further, it will be appreciated that it may be desired to provide suitable actuation means for the backup roller 214A while rotatably supporting the splicing roller 213A about a fixed axis of rotation.

Figure 17:
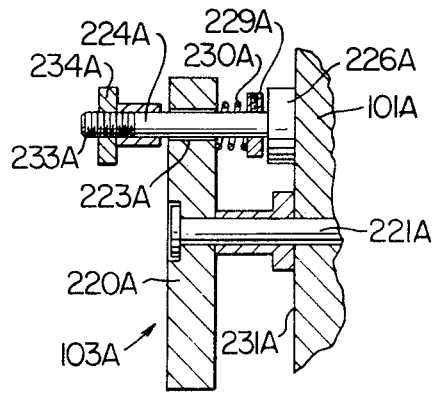
FIG. 17 is an enlarged fragmentary view in elevation illustrating another exemplary embodiment of a brake device used with each spaced supporting roller defining the unwinding station of the apparatus shown in FIG. 14.

Another exemplary embodiment of a brake device is illustrated in FIG. 17 of the drawings and the brake device of FIG. 17 is very similar to the brake device 103 previously described. Therefore, the brake device of FIG. 17 will be designated generally by the reference numeral 103A. The brake device 103A may be used interchangeably with the brake device 103 and the main difference between the brake device 103 and 103A is that the brake device 103A is constructed so that its structural portions are arranged entirely within the peripheral outline of its associated roller, either roller 101A or roller 102A.

The brake device 103A has an arm 220A which is fixed to the fixed shaft 221A of its associated supporting roller in any suitable manner and the arm 220A has an opening 223A extending through the outer end thereof. A rod 224A is provided and is axially slidable through the opening 223A and the rod 224A carries a brake shoe 226A at its terminal inner end. A compression spring 230A is provided and acts between arm 220A and on axially adjustable disc 229A which may be adjustably positioned along rod 224A. The spring 230A urges rod 224A and hence brake shoe 226A into frictional contact with a cooperating annular friction surface 231A defining the outer surface of its associated roller, either roller 101A or 102A. The rod 224A has a threaded outer end 233A which is adapted to receive a threaded nut assembly 234A. Thus, the position of the brake shoe 226A relative to the annular friction brake surface 231A is controlled by threading the nut 234A in and out on the threaded outer end 233A of the rod 224A. The force exerted by spring 230A may be adjusted by suitably adjusting the disc 229A along the rod 224A. The compression spring 230A may also be suitably replaced with a similar spring which may exert any desired frictional force.

Thus it is seen that this invention provides a winding apparatus 32, for example, which provides precisely controlled winding of electrical strip conductor coils 25 under conditions where a support plate 31 and associated supporting rollers assure that each supply roll 35 may be easily and precisely unwound at an unwinding station 34. In addition, a plurality of supply rolls 35 may be automatically and serially introduced into the unwinding station using a unique feed system which is comprised of a roller and lever system. Also, a simple device and method is employed in this overall structure for automatically splicing the leading end portion 66 of a new supply roll 35 to the trailing end 67 of an elongated strip 27 comprising a spent supply roll. The splicing device effectively utilizes the heat-sealing characteristics of the insulating material 30 provided on the elongated strip 27 to provide automatic splicing without stopping the winding apparatus or machine 32.

The support plate 31 of apparatus 32 may be made of any suitable metallic material provided with a substantially frictionless highly polished surface to enable easy unwinding rotation of the supply roll 35. It will also be appreciated that the outside surface of the inclined support plate 31 may be made of or suitably treated with any suitable antifriction material, either metallic or nonmetallic, to provide the desired frictionless surface. Also, the angle of inclination 33 of the support plate 31 may be suitably adjusted to provide the desired unwinding rotation of each supply roll 35 at the unwinding station 34.

The improved apparatus and method of this invention has been illustrated and described in connection with the supporting of the supply rolls 35 of strip material 27 used in forming electrical coils 25. However, it will be appreciated that the concept of an inclined support plate 31 with its associated supporting rollers may be utilized to handle practically any type of strip material wound in roll form including both large diameter rolls and small diameter rolls. Further, any width of material may be handled simply by adjusting the width of the inclined table 105. In addition, it will be appreciated that any desired number of supporting rollers similar to rollers 101 and 102 may be provided with provisions to move certain ones of such rollers to enable the weight of exceptionally heavy supply rolls to be distributed over a large number of rollers.

The supporting rollers 101 and 102, for example, of the apparatus 32 are shown as being freely rotatable. However, it will be appreciated that an inclined supporting plate and similar rollers may be utilized wherein the rollers may be power driven and utilized to wind strip material on a core which may be rotatably supported with an edge thereof substantially coinciding with the outer surface of the inclined plate which may be similar to the supporting plate 31.

While present exemplary embodiments of this invention, and methods of practicing the same, have been illustrated and described, it will be recognized that this invention may be otherwise variously embodied and practiced within the scope of the following claims.

What is claimed is:

1. An apparatus for supporting a supply roll of elongated strip material, controlling the unwinding thereof, and splicing said strip material to a similar strip material unwound from another roll, said apparatus comprising a substantially planar support inclined at an acute angle relative to a vertical plane and roller means engaging the lower outer periphery of said supply roll and defining a supply roll unwinding station, said roller means comprising a plurality of spaced rollers each having an axis of rotation arranged perpendicular to said planar support to support said supply roll and hold a side thereof against said planar support, and a device for splicing a leading end portion of said strip material having heat-sealable outer surface means to the trailing end portion of said similar strip material which also has heat-sealable outer surface means, said splicing device including a rotatable splicing roller having a heatable outer surface and heating means for heating said heatable outer surface, said splicing roller being adapted to engage and firmly clamp said trailing end portion against the outer turn of said supply roll defining said leading end portion of said strip material at said unwinding station so that movement of said trailing end portion rotates said splicing roller, and said heating means heats said heatable outer surface which heats the outer surface means of said leading end portion to heat seal said leading end portion to said trailing end portion.

2. An apparatus as set forth in claim 1 in which said splicing roller of said splicing device comprises one of said plurality of spaced rollers at said unwinding station.

3. An apparatus as set forth in claim 1 in which said splicing device further comprises an actuator for moving said splicing roller toward and away from said supply roll at said unwinding station.

4. An apparatus as set forth in claim 1 in which said heatable outer surface comprises an electrically heatable outer surface and further comprising an electric circuit for providing an instantaneous high heat during rotation of said splicing roller and an actuator for moving said splicing roller to enable firm clamping of said leading end portion and said trailing end portion against each other.

5. An apparatus for supporting a supply roll of elongated strip material, controlling the unwinding thereof, and splicing said strip material comprising, a substantially planar support inclined at an acute angle relative to a vertical plane, roller means engaging the lower outer periphery of said supply roll and defining a supply roll unwinding station, said roller means cooperating with said planar support to support said supply roll and hold a side thereof against said planar support, and a device for splicing a leading end portion of said strip material to a trailing end portion of a similar unwound strip material.

6. An apparatus as set forth in claim 5 in which said strip material has heat-sealable outer surface means and said splicing device compirses a rotatable splicing roller having a heatable outer surface, a backup roller, and an actuator for relatively moving said splicing roller and backup roller toward each other to clamp said leading end portion of said strip material and said trailing end portion of said similar unwound strip material therebetween with said heatable surface in a hot condition to heat seal said leading end portion and trailing end portion together.

7. A device for splicing a leading end portion of an elongated strip material having heat-sealable outer surface means to the trailing end portion of a similar continuously moving strip material also having heat-sealable outer surface means, said device comprising, a rotatable splicing roller having a heatable outer surface, means for clamping said end portions of strip material together and against said heatable outer surface with said heat-sealable outer surface means between said end portions, and heating means for heating said heatable outer surface with said end portions clamped together to heat seal said end portions together while continuously moving said end portions over said splicing roller.

8. A device as set forth in claim 7 wherein said splicing roller is provided adjacent a plurality of spaced supporting rollers defining a supply roll unwinding station and normally carrying a supply roll thereon, said splicing roller being adapted to be moved by said clamping means to engage and firmly clamp said trailing end portion against the outer turn of said supply roll defining said leading end portion of said strip material at said unwinding station so that movement of said trailing end portion rotates said splicing roller, and said heat-sealing means heats said heatable outer surface which heats the outer surface means of said leading end portion to heat seal said leading end portion to said trailing end portion.

9. A device as set forth in claim 8 in which said clamping means comprises an actuator for moving said splicing roller toward and away from said supply roll at said unwinding station.

10. A device as set forth in claim 8 and further comprising a sensing device arranged downstream of said supply roll unwinding station for sensing the increased thickness of the heat sealed end portions and a cutting knife operatively connected to said sensing device for severing the tail end of said trailing end portion.

11. A device as set forth in claim 8 in which said heatable outer surface comprises heatable projection means capable of providing a high heat over a comparatively small surface area.

12. A device as set forth in claim 8 in which said end portions comprise end portions of electrically conductive material, said heat-sealable outer surface means comprises a heat-sealable plastic electrical insulating material adhered against said electrically conductive material, and said clamping means comprises an actuator for moving said splicing roller to enable firm clamping of said leading end portion and said trailing end portion against each other.

13. A device as set forth in claim 12 in which said heatable outer surface comprises a heatable substantially annular ridge having a width substantially smaller than the width of said splicing roller and being capable of providing a high heat over a comparatively small surface area to thereby cause a corresponding narrow width of said electrical insulating material to be melted away to simultaneously provide splicing of said end portions as well as a high quality electrical connection therebetween.

14. A device as set forth in claim 13 in which said annular ridge comprises a substantially toothed annular ridge.

15. A device as set forth in claim 13 in which said heatable outer surface comprises a heatable substantially knurled surface having a plurality of projections extending outwardly of the main periphery thereof and capable of providing high concentrated heat over comparatively small surface areas corresponding in size to said plurality of projections to thereby provide a high strength splice between said end portions as well as a high quality electrical connection therebetween.

16. A device as set forth in claim 9 and further comprising a backup roller arranged downstream of said supply roll, another splicing roller, and means for relatively moving said other splicing roller and backup roller toward each other to clamp said leading end portion and said trailing end portion therebetween, said other splicing roller and backup roller cooperating with the first named splicing roller to provide a splice of optimum strength.

17. A strip conductor coil winding machine comprising, an apparatus for supporting a supply roll of elongated strip material, controlling the unwinding thereof, and splicing said strip material to a similar strip material unwound from another roll during the coiling of the elongated strip material to define a coil, said apparatus comprising, a substantially planar support inclined at an acute angle relative to a vertical plane and roller means engaging the lower outer periphery of said supply roll and defining a supply roll unwinding station, said roller means comprising a plurality of spaced rollers cooperating with said planar support to support said supply roll and hold a side thereof against said planar support, a downwardly inclined table having a lower end arranged above the lowermost of said plurality of spaced rollers and being particularly adapted to support a plurality of supply rolls of said strip material for rolling movement downwardly therealong, said table cooperating with said planar support to hold a side of each of said plurality of rolls against said planar support, a supply roll feed system, said feed system automatically and serially delivering said supply rolls onto said plurality of rollers defining said unwinding station once a supply roll at the unwinding station has been substantially spent and removed from said unwinding station, and a device for splicing a leading end portion of said strip material having heat-sealable outer surface means to the trailing end portion of said similar strip material which also has heat-sealable outer surface means, said splicing device including a rotatable splicing roller having a heatable outer surface and heating means for heating said heatable outer surface, said splicing roller being adapted to engage and firmly clamp said trailing end portion against the outer turn of said supply roll defining said leading end portion of said strip material at said unwinding station so that movement of said trailing end portion rotates said splicing roller, and said heating means heats said heatable outer surface which heats the outer surface means of said leading end portion to heat seal said leading end portion to said trailing end portion.

18. A machine as set forth in claim 17 in which said heating means comprises electrical heating means and further comprising a switch adapted to be actuated by said substantially spent supply roll, said switch controlling the operation of said electrical heating means.

19. A machine as set forth in claim 17 and further comprising a sensing device for sensing the increased thickness of said heat-sealed end portions, said sensing device being operatively connected to control the action of a knife used to sever away that portion of said trailing end portion adjoining the substantially spent supply roll.

20. A machine as set forth in claim 17 in which said heating means comprises electrical heating means, and further comprising, an electrical switch adapted to be actuated by said substantially spent supply roll, said switch controlling the operation of said electrical heating means, a sensing device for sensing the increased thickness of said heat-sealed end portions, and a knife for severing that portion of said trailing end portion adjoining the substantially spent supply roll to thus assure the length of said heat-sealed end portions is kept at a minimum, said sensing device being operatively connected to control the action of said knife.

21. A machine as set forth in claim 20 in which said sensing means comprises a pair of cooperating rollers yieldingly urged toward each other, one of said cooperating rollers being operatively connected to a switch which controls the action of said knife.

References Cited

UNITED STATES PATENTS

| | | | |
|---|---|---|---|
| 2,941,742 | 6/1960 | Willis | 242—58 |
| 3,542,627 | 11/1970 | Osmalov et al. | 156—502 |
| 3,374,963 | 3/1968 | Conti | 156—502 X |
| 3,065,782 | 11/1962 | Vergobbi | 242—58.4 X |

PHILIP DIER, Primary Examiner

U.S. Cl. X.R.

156—510, 157; 242—58.4